(12) United States Patent
Nilsen

(10) Patent No.: US 7,330,315 B2
(45) Date of Patent: Feb. 12, 2008

(54) LIGHT-REDIRECTING OPTICAL STRUCTURES

(75) Inventor: Robert B. Nilsen, Mystic, CT (US)

(73) Assignee: Reflexite Corporation, Avon, CT (US)

( * ) Notice: Subject to any disclaimer, the term of this patent is extended or adjusted under 35 U.S.C. 154(b) by 0 days.

(21) Appl. No.: 10/830,701

(22) Filed: Apr. 23, 2004

(65) Prior Publication Data

US 2004/0246599 A1    Dec. 9, 2004

Related U.S. Application Data

(60) Provisional application No. 60/467,494, filed on May 2, 2003.

(51) Int. Cl.
G02B 27/10    (2006.01)

(52) U.S. Cl. .................. 359/640; 359/619; 359/628; 362/337; 362/339; 362/620

(58) Field of Classification Search ................ 359/454, 359/455, 619–628; 362/619, 628, 337, 339, 362/620
See application file for complete search history.

(56) References Cited

U.S. PATENT DOCUMENTS

| | | |
|---|---|---|
| 2,248,638 A | 7/1941 | Merton |
| 2,310,790 A | 2/1943 | Jungersen |
| 2,380,447 A | 7/1945 | Jungersen |
| 2,474,317 A | 6/1949 | McPhail |
| 3,684,348 A | 8/1972 | Rowland |
| 3,712,706 A | 1/1973 | Stamm |
| 3,718,078 A | 2/1973 | Plummer |
| 3,853,578 A | 12/1974 | Suzuki et al. |
| 4,013,465 A | 3/1977 | Clapham et al. |
| 4,064,433 A | 12/1977 | Korn |
| 4,154,219 A | 5/1979 | Gupta et al. |

(Continued)

FOREIGN PATENT DOCUMENTS

JP    200210963    2/2000

(Continued)

OTHER PUBLICATIONS

Avrutsky, Ivan A. et al., "Multiwavelength Diffraction and Apodization Using Binary Superimposed Gratings," *IEEE Photonics Technology Letters*, 10(6):839-841 (1998).

(Continued)

*Primary Examiner*—Hung X. Dang
*Assistant Examiner*—Joseph Martinez
(74) *Attorney, Agent, or Firm*—Hamilton, Brook, Smith & Reynolds, P.C.

(57) ABSTRACT

A plurality of microstructures is provided, with each microstructure having at least a first side and at least a second side terminating at a peak. At least some of the peaks can include an elevated portion to space the peaks away from adjacent optical sheets, surfaces, films, substrates, or other layers to minimize wet-out, Newton's rings, abrasions, moiré fringes, or other undesirable optical conditions. In other embodiments, an optical film is also provided that includes a first plurality of microstructures having a base, a first side, and a second side, and a second plurality of microstructures having a base, a first side, and a second side, the first side including a first planar surface, and the second side including a second planar surface and a third planar surface.

19 Claims, 12 Drawing Sheets

U.S. PATENT DOCUMENTS

| | | | |
|---|---|---|---|
| 4,242,723 A | 12/1980 | Fabbri et al. | |
| 4,260,220 A | 4/1981 | Whitehead | |
| 4,374,077 A | 2/1983 | Kerfeld | |
| 4,402,571 A | 9/1983 | Cowan et al. | |
| 4,469,407 A | 9/1984 | Cowan et al. | |
| 4,477,529 A | 10/1984 | Campbell | |
| 4,485,123 A | 11/1984 | Troue | |
| 4,496,216 A | 1/1985 | Cowan | |
| 4,514,345 A | 4/1985 | Johnson et al. | |
| 4,542,449 A | 9/1985 | Whitehead | |
| 4,576,850 A | 3/1986 | Martens | |
| 4,732,715 A | 3/1988 | Bawa et al. | |
| 4,791,540 A | 12/1988 | Dreyer, Jr. et al. | |
| 4,839,250 A | 6/1989 | Cowan | |
| 4,874,213 A | 10/1989 | Cowan | |
| 4,874,228 A | 10/1989 | Aho et al. | |
| 4,883,341 A | 11/1989 | Whitehead | |
| 4,888,260 A | 12/1989 | Cowan | |
| 4,906,070 A | 3/1990 | Cobb, Jr. | |
| 4,937,716 A | 6/1990 | Whitehead | |
| 4,984,144 A | 1/1991 | Cobb, Jr. et al. | |
| 4,999,234 A | 3/1991 | Cowan | |
| 5,005,108 A | 4/1991 | Pristash et al. | |
| 5,015,524 A | 5/1991 | Kobayashi et al. | |
| 5,056,892 A | 10/1991 | Cobb, Jr. | |
| 5,093,765 A | 3/1992 | Kashima et al. | |
| 5,126,882 A | 6/1992 | Oe et al. | |
| 5,161,041 A | 11/1992 | Abileah et al. | |
| 5,175,030 A | 12/1992 | Lu et al. | |
| 5,183,597 A | 2/1993 | Lu | |
| 5,186,530 A | 2/1993 | Whitehead | |
| 5,190,370 A | 3/1993 | Miller et al. | |
| 5,267,062 A | 11/1993 | Bottorf | |
| 5,289,351 A | 2/1994 | Kashima et al. | |
| 5,394,255 A | 2/1995 | Yokota et al. | |
| 5,396,350 A | 3/1995 | Beeson et al. | |
| 5,442,523 A | 8/1995 | Kashima et al. | |
| 5,521,797 A | 5/1996 | Kashima et al. | |
| 5,550,676 A | 8/1996 | Ohe et al. | |
| 5,565,151 A | 10/1996 | Nilsen | |
| 5,579,134 A | 11/1996 | Lengyel | |
| 5,592,332 A | 1/1997 | Nishio et al. | |
| 5,598,280 A | 1/1997 | Nishio et al. | |
| 5,600,462 A | 2/1997 | Suzuki et al. | |
| 5,629,784 A | 5/1997 | Abileah et al. | |
| 5,635,278 A | 6/1997 | Williams | |
| 5,670,096 A | 9/1997 | Lu | |
| 5,711,589 A | 1/1998 | Oe et al. | |
| 5,716,681 A | 2/1998 | Williams | |
| 5,724,108 A | 3/1998 | Shibata | |
| 5,730,518 A | 3/1998 | Kashima et al. | |
| 5,769,522 A | 6/1998 | Kaneko et al. | |
| 5,771,328 A | 6/1998 | Wortman et al. | |
| 5,780,140 A | 7/1998 | Nilsen | |
| 5,816,677 A | 10/1998 | Kurematsu et al. | |
| 5,838,403 A | 11/1998 | Jannson et al. | |
| 5,844,720 A | 12/1998 | Ohara et al. | |
| 5,851,062 A | 12/1998 | Shinohara et al. | |
| 5,857,561 A | 1/1999 | Hardman et al. | |
| 5,863,113 A | 1/1999 | Oe et al. | |
| 5,919,551 A | 7/1999 | Cobb, Jr. et al. | |
| 5,932,626 A | 8/1999 | Fong et al. | |
| 5,940,149 A | 8/1999 | Vanderwerf et al. | |
| 5,995,690 A | 11/1999 | Kotz et al. | |
| 6,052,164 A | 4/2000 | Cobb, Jr. et al. | |
| 6,075,649 A | 6/2000 | Naito | |
| 6,114,010 A | 9/2000 | Williams | |
| 6,147,804 A | 11/2000 | Kashima et al. | |
| 6,277,471 B1 | 8/2001 | Tang | |
| 6,322,236 B1 | 11/2001 | Campbell et al. | |
| 6,354,709 B1 * | 3/2002 | Campbell et al. | 362/627 |
| 6,356,389 B1 | 3/2002 | Nilsen et al. | |
| 6,357,888 B1 | 3/2002 | Takata et al. | |
| 6,359,735 B1 | 3/2002 | Gombert et al. | |
| 6,576,887 B2 * | 6/2003 | Whitney et al. | 250/227.11 |
| 6,845,212 B2 * | 1/2005 | Gardiner et al. | 385/146 |
| 2002/0057497 A1 | 5/2002 | Gardiner et al. | |
| 2003/0214728 A1 | 11/2003 | Olczak | |

FOREIGN PATENT DOCUMENTS

| | | |
|---|---|---|
| WO | WO 96/10761 | 4/1996 |
| WO | WO 96/27757 A1 | 9/1996 |
| WO | WO 97/14075 | 4/1997 |
| WO | WO 97/28468 | 8/1997 |
| WO | WO 97/30604 | 8/1997 |
| WO | WO 97/31276 A1 | 8/1997 |
| WO | WO 98/50805 | 11/1998 |
| WO | WO 98/50806 | 11/1998 |
| WO | WO 99/11434 | 2/1999 |
| WO | WO 99/42861 | 8/1999 |
| WO | WO 00/48037 | 8/2000 |
| WO | WO 01/27527 A1 | 4/2001 |
| WO | WO 01/35128 A2 | 5/2001 |
| WO | WO 01/58991 A1 | 8/2001 |
| WO | WO 02/04858 A3 | 1/2002 |
| WO | WO 02/14909 A2 | 2/2002 |
| WO | WO 02/16106 A2 | 2/2002 |
| WO | WO 02/34514 A1 | 5/2002 |

OTHER PUBLICATIONS

Cowan, James J., "Aztek surface-relief volume diffractive structure," *Journal of the Optical Society of America A*, 7(8):1529-1544 (1990).

Cowan, James J., "The Holographic Honeycomb Microlens," *Proceedings of SPIE-The International Society for Optical Engineering*, 523:251-259 (1985).

Francon, M., *Optical Interferometry*, pp. 40-41 (1966).

Guerra, John M., P.E., President, "Preliminary Report: Suitability of PTM to Analysis of Optikos Sample," Optikos Corp. and Nanoptek Corp. (2002).

Jenkins, Francis A. et al., *Fundamentals of Optics*, Third Edition, 2 pages (1957).

Mihailov, Stephen J. et al., "Apodization technique for fiber grating fabrication with a halftone transmission amplitude mask," *Applied Optics*, 39(21):3670-3677 (2000).

Japanese Abstract of JP8137375 Published May 31, 1996.

* cited by examiner

LIGHT-REDIRECTING OPTICAL STRUCTURES

RELATED APPLICATION

This application claims the benefit of U.S. Provisional Application No. 60/467,494, filed May 2, 2003, the entire teachings of which are incorporated herein by reference.

BACKGROUND OF THE INVENTION

Brightness enhancing films (BEF) have been used in lighting panels for directing light from lighting fixtures through luminaires, laptop computers displays, and flat panel desk top monitors or displays. The brightness enhancing films, which can have linear prisms, diffuse light with a desired directionality. Often the films have been used in combination with a fluorescent light source. The films have had partial success in improving luminaire or display brightness by controlling the angle at which light emerges.

Optical films are often used in combination with other films or sheets. For example, two diffuse films and two light-redirecting or collimating films are used as a stack on a light guide behind liquid crystal displays. When the optical films are positioned adjacent another layer, such as a diffuser or another optical film, defects in the lighting panel are often noticeable by the viewer. One such defect is caused by the optical film "wetting-out", which can occur when the film contacts an adjacent film. At the point of contact, the change in refractive index is eliminated or substantially attenuated for light passing through the two films. Since the two films are not uniformly contacting one another, defects are noticeable by the viewer.

Another defect that may be present is referred to as "Newton's rings," which occurs when two films are gradually separated from each other, for example, by a particle such as dust.

SUMMARY OF THE INVENTION

In particular embodiments of the invention, a plurality or an array of microstructures is provided, with each microstructure having at least a first side and at least a second side terminating at a peak. At least some of the peaks can include an elevated portion to space the peaks away from adjacent optical sheets, surfaces, films, substrates, or other layers to minimize wet-out, Newton's rings, abrasions, moiré fringes, or other undesirable optical conditions.

The microstructures can be designed to redirect or collimate light. In specific embodiments, the microstructures can include linear prisms, prisms, pyramids, truncated pyramids, lenticulars, cones, moth-eye structured surfaces, diffractive structures, diffractive structured surfaces, textured surfaces, base planes and plateaus, lenses, and/or lens arrays. The elevated portions space the adjacent surface away from the peaks by at least about 0.3 micrometers. In embodiments of the invention, the microstructures form part of a rear-projection screen, a computer display or monitor, an overhead projection display, or a liquid crystal display.

In other embodiments of the invention, the microstructures have a series of base planes and a series of plateaus at a window side of the microstructures. The base planes and the plateaus run along a first axis, with the plateaus and base planes alternating along a second axis. The plateaus are not coplanar with the base planes in one embodiment of the invention. At least some of the plateaus can include an elevated portion extending above the plateaus. In further embodiments, moth-eye structures or differentially-cured patterns can also be provided on a window side of the prisms. In specific embodiments, at least some areas of the window side can include an elevated portion extending above the window side.

A pattern, which can be visible to the naked eye in one embodiment, can be formed in a window side of the prisms. The pattern is formed in a particular embodiment by placing a mask, which includes opaque areas and transparent areas, over the window side of the prisms. The microstructures are cured with a radiation source, wherein the opaque areas block the radiation to cause the area of the windows underneath the opaque areas to be cured at a different amount of time or rate than the area underneath the transparent areas, which results in the visible patterns in the windows.

An optical film is also provided that includes a first plurality of microstructures having a base, a first side, and a second side, and a second plurality of microstructures having a base, a first side, and a second side, the first side including a first planar surface, and the second side including a second planar surface and a third planar surface. The film can include at least a first zone that includes the first plurality of microstructures and at least a second zone that includes the second plurality of microstructures. The first zone and the second zone can alternate along the film.

In specific embodiments, peaks of the first plurality of microstructures extend above peaks of the second plurality of microstructures to space the peaks away from adjacent optical sheets, surfaces, films, substrates, or other layers to minimize wet-out, Newton's rings, abrasions, moiré fringes, or other undesirable optical conditions. The peaks of the first plurality of microstructures can extend above the peaks of the second plurality of microstructures by at least about 0.3 micrometers.

In particular embodiments, the first, second, and third planar surfaces each have a different cross-sectional length. The second plurality of microstructures includes a base and the first side includes the first planar surface extending from the base to a fourth planar surface. The fourth planar surface extends to the second planar surface at an apex of the microstructures.

The second planar surface and the third planar surface can be concave or convex-shaped as viewed in cross-section. The film can include a first cured portion and a second cured portion that are formed from a same radiation-curable material, with the first cured portion being cured to a first amount of time or at a first rate and the second cured portion being cured to a second amount of time or at a second rate, wherein the first amount of time or rate is sufficiently different than the second amount of time or rate to result in a discontinuity on the surface of the structure.

In other embodiments, a microstructure is provided having a first side and a second side terminating at a linear apex, wherein at least one section of the apex extends above the linear apex. The at least one section can be rounded or elongate in specific embodiments.

In yet other embodiments, an optical structure is provided that includes an optical layer and a plurality of microstructures, each having at least a first side and a second side terminating at a peak, with peaks of the prisms being spaced sufficiently away from the optical layer to prevent or minimize an undesirable optical condition, such as wet-out. The optical layer can include a diffuser.

In one embodiment, the plurality of microstructures is a first plurality of microstructures, and the optical structure further includes a second plurality of microstructures positioned below the first plurality of microstructures. The second plurality of microstructures can be offset relative to the first plurality of microstructures.

A diffuser and/or waveguide can be positioned below the second plurality of microstructures. At least some of the peaks include an elevated portion for spacing the optical layer away from the peaks.

The optical structure can further include a second plurality of microstructures having a base, a first side, and a second side, with the first side including a first planar surface, and the second side including a second planar surface and a third planar surface. The peaks of the first plurality of microstructures extend above peaks of the second plurality of microstructures to space peaks of the second plurality of microstructures away from the optical layer to prevent or minimize an undesirable optical condition, such as wet-out.

BRIEF DESCRIPTION OF THE DRAWINGS

The foregoing and other objects, features and advantages of the invention will be apparent from the following more particular description of various embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of various embodiments of the invention follows. Often, the term optical "sheets" refers to a more rigid substrate, for example, one that could be leaned against a wall without folding over on itself, and the term optical "films" refers to a substrate that is more flexible, for example, one that could be rolled up. However, depending on the size and thickness of the sample, a film can act as a sheet. For example, a small, thin polyester film can be rigid enough to lean against a wall without folding over on itself. For purposes of understanding aspects of the present invention, the terms "sheet" and "film" can be used interchangeably. Sheets and films of the present invention can be formed from plastic material, such as, polyurethane, polypropylene, polyvinyl chloride, polycarbonate, polyester, polyurea, or polymethylmethacrylate. Polyurea is disclosed in U.S. Provisional Application No. 60/402,484, filed on Aug. 8, 2002, and U.S. patent application Ser. No. 10/634,122, filed on Aug. 4, 2003, the entire teachings of each application being incorporated herein by reference.

Figure 1:
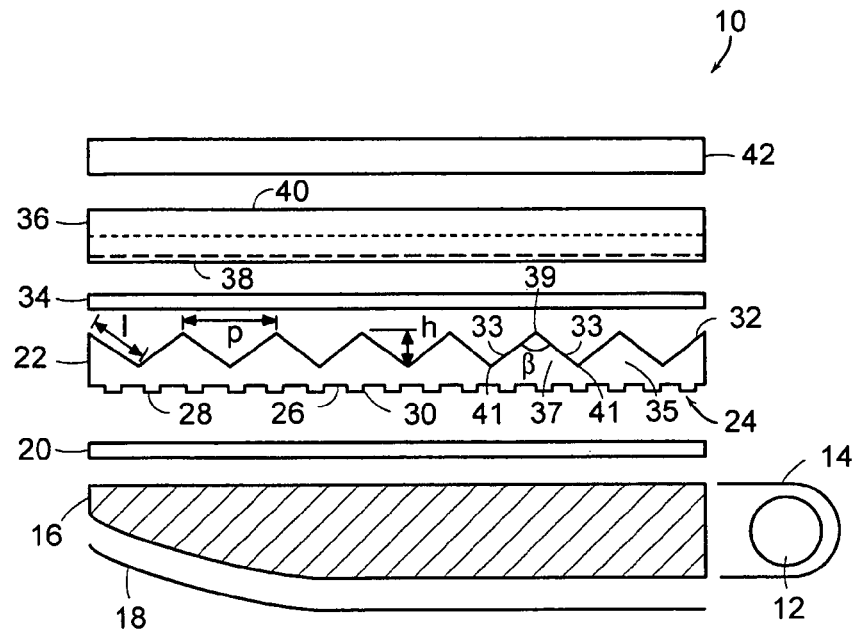
FIG. 1 is a cross-sectional view of a back lighting system.

With respect to the optical performance of a redirecting or collimating film, it has been found that for individual active matrix liquid crystal display back lighting system designs, the optical efficiency of the particular lamp, waveguide and diffuser system can be improved by designing a collimating film to maximize the use of the diffraction and refraction effects. For example, as shown in FIG. 1, a back lighting system 10 includes a light source 12 and light reflector 14. Light source 12 can be a fluorescent light, LED light, incandescent light or other suitable light source. Waveguide 16, which is for directing light out of back lighting system, can be formed of a transparent solid material and can be wedge-shaped. On one side of waveguide 16 is waveguide reflector 18 formed of a specular material, such as aluminum or a coated white surface, for reflecting light back to waveguide 16.

Waveguide reflector 18 can be curved or flat, or a combination thereof. Diffuser 20 is a film that diffuses the light from the waveguide 16 into a substantially uniform distribution. An example of a suitable diffuser is a randomly textured surface or gradient index film or engineered diffractive structure.

Above diffuser 20, first light redirecting or collimating film 22 can have a grooved structure 24 on a first side adjacent waveguide 16 as disclosed in U.S. patent application Ser. No. 10/046,929, filed on Jan. 15, 2002 and published as U.S. Patent Application Publication No. US2003/0133301 on Jul. 17, 2003, the entire teachings of which are incorporated herein by reference. Grooved structure 24 can have a series of base planes 26 and plateaus 28 that run along a first axis from one side of collimating film 22 to a second side of collimating film 22 to provide an unsmooth surface opposite the prism surface 32. Linear prism surface 32 can have prism surfaces 33 and windows 35 and be formed of a transparent polymeric material. Prisms 37 have sides 33 with peaks 39 and valleys 41. The pitch (p) of the prisms 37 is measured from valley 41 to next valley 41. In one embodiment, the pitch can be in the range of between 25 and 76 micrometers (0.001 and 0.003 inches). The height (h) of the linear prisms 37 is measured by the vertical distance from the valley 41 to peak 39. The height (h) can be in the range of between 7.6 and 38 micrometers (0.0003 and 0.0015 inches). Included angle ($\beta$) is measured between the two sides 33 that meet at peak 39. The angle ($\beta$) can range from about 60 to 120 degrees. In one embodiment, the angle ($\beta$) is in a range of between about 60 and 85 degrees or between about 95 and 120 degrees. Sides 33 on each side of peak 39 can be side length (l) from valley 41 to peak 39 to form an isosceles triangle. In particular embodiments, the sides can have different lengths, such as with a scalene triangle, thereby tilting or canting the prisms.

Base planes 26 and plateaus 28 are connected by walls 30 that can be substantially perpendicular to base planes 26 and plateaus 28. Walls 30 can be a few degrees off perpendicular to either base planes 26 and plateaus 28. Also, the walls can be curved. Base planes 26 and plateaus 28 are of such sizes and spacing to reduce the visibility of Newton's rings and moiré fringes while minimizing surface to surface contact with films or the peaks of prisms, thereby reducing wet-out. The width of base plane 26 can be in the range of between about 1 and about 300 micrometers. In another embodiment, the width of base plane 26 can be in the range of between about 10 and about 200 micrometers. The width of plateaus 28 can be in the range of between about 1 and 50 micrometers. In another embodiment, the width of plateaus 28 can be between about 10 and about 50 micrometers. The ratio of the width of plateau 28 to the width of base planes 26 can be in the range of between about one 1 about 10. In one embodiment, base planes have a width of about 150 micrometers (0.006 inches) and plateaus have a width of about 25 micrometers (0.001 inches). In another embodiment, base planes have a width of about 185 micrometers (0.0073 inches) and plateaus have a width of about 33 micrometers (0.0013 inches). Wall 30 can have a height in the range of between about 0.4 and about 0.8 micrometers which provides a difference in elevation between base planes 26 and plateaus 28 from a base point in the film. In an embodiment, the height of walls 30 is in the range of between about 0.5 and 0.8 micrometers. The difference in elevation between the base plane and plateaus can be less than about the wavelength of visible light. The dimensions of the width of the plateaus can each be less than about 3.175 micrometers ($1.25 \times 10^{-4}$ inches).

An optional abrasion reduction layer 34 can be positioned between first collimating film 22 and second collimating film 36. Abrasion reduction layer 34 can have a grooved structure on one or two surfaces to improve performance by reducing wetting or Newton's rings. In further embodiments, a diffusing layer can be positioned above first collimating film 22 in combination with or without the abrasion reduction layer 34.

Second light-redirecting or collimating film 36 can include second grooved structure 38 on a first side adjacent first collimating film 22 and prism structure 40 on an opposing side. Prism structure 40 of second collimating film 36 can be oriented in the same direction as the prisms on first collimating film 22. In particular embodiments, it can be offset by rotating the prism orientation up to about 180 degrees. In an embodiment, second collimating film 36 is rotated about ninety degrees with respect to the first collimating film to reduce moiré fringe formation and improve the uniformity of the exiting light distribution. Also, if abrasion reduction layer 34 is not present, the peaks 39 cross the grooved structure 38 with minimal contact to reduce wet-out between films.

Above second collimating film 36 is liquid crystal display 42. A diffusing layer can be positioned above the second collimating film 36. A collimating film which has linear prisms designed with a tilt, size and included angle which match the light source, waveguide and diffuser properties provides enhanced performance. The advantages of employing linear prisms with included angles which range from 95 degrees to 120 degrees provides a light distribution which can be optimized for viewing angles of a computer screen. The included angle is considered the top angle of a triangular linear prism structure.

Figure 2:
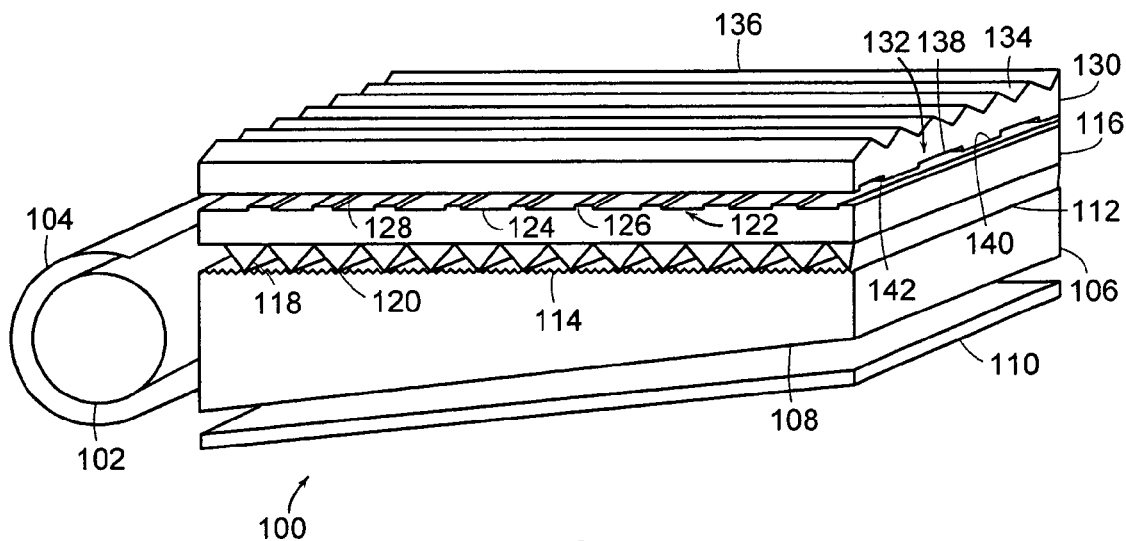
FIG. 2 is a perspective view of another embodiment of a back lighting system.

Another embodiment in which embodiments of optical films of the present invention can be used is shown in FIG. 2. A back lighting system 100 includes a light source 102 and a light reflector 104. Waveguide 106 can be formed of a transparent solid material and can be wedge-shaped. Adjacent to the first side 108 of waveguide 106 is waveguide reflector 110 formed of a specular reflecting material. The reflector 110 can be spaced slightly away from surface 108 to allow total internal reflection at surface 108 to take place. In other embodiments, the reflector 110 can have a grooved structure on the side facing waveguide 106. The grooved structure of the reflector can be coated with a specular reflecting material. In particular embodiments, if the reflector 110 is transparent, the reflector can be coated on the side away from waveguide 106. First side 108 can be stepped in shape. Second side 112 of waveguide 106 is on the opposite side away from waveguide reflector 110 and can have grooved structures 114.

Above waveguide 106, first collimating film 116 has first prism structure 118 with peaks 120 pointed toward waveguide 106. In further embodiments, a diffusing layer is positioned above waveguide 106. First collimating film 116 can include first grooved structures 122 on the window side of first prism structure 118. The peaks of linear prisms on first collimating film 116 can run parallel to light source 102. First grooved structure 122 has base planes 124 and plateaus 126 that are in parallel with peaks 120 to provide a non-smooth structured surface. Base planes 124 and plateaus 126 are connected by walls 128. Walls 128 can be substantially perpendicular to base planes 124 and plateaus 126, which includes walls 128 that can be a few degrees off perpendicular to either base planes and plateaus. Also, the walls can be curved. Base planes 124 and plateaus 126 can be substantially parallel but not coplanar.

Above first collimating film 116, second collimating film 130 can include second grooved structure 132 and second prism structure 134. Peaks 136 of second prism structure 134 point away from waveguide 106. Second grooved structure 132 has base planes 138 and plateaus 140 which are in parallel with peaks 136 to provide a non-smooth structured surface. Base planes 138 and plateaus 140 are connected by walls 142 and are substantially parallel but not coplanar in a particular embodiment. The peaks 136 of second prism structure 134 can be oriented in a non-parallel direction to peaks 120 of first prism structure 118. Another orientation is 90 degrees. A diffusing layer can be positioned above second collimating film 130.

Figure 3:
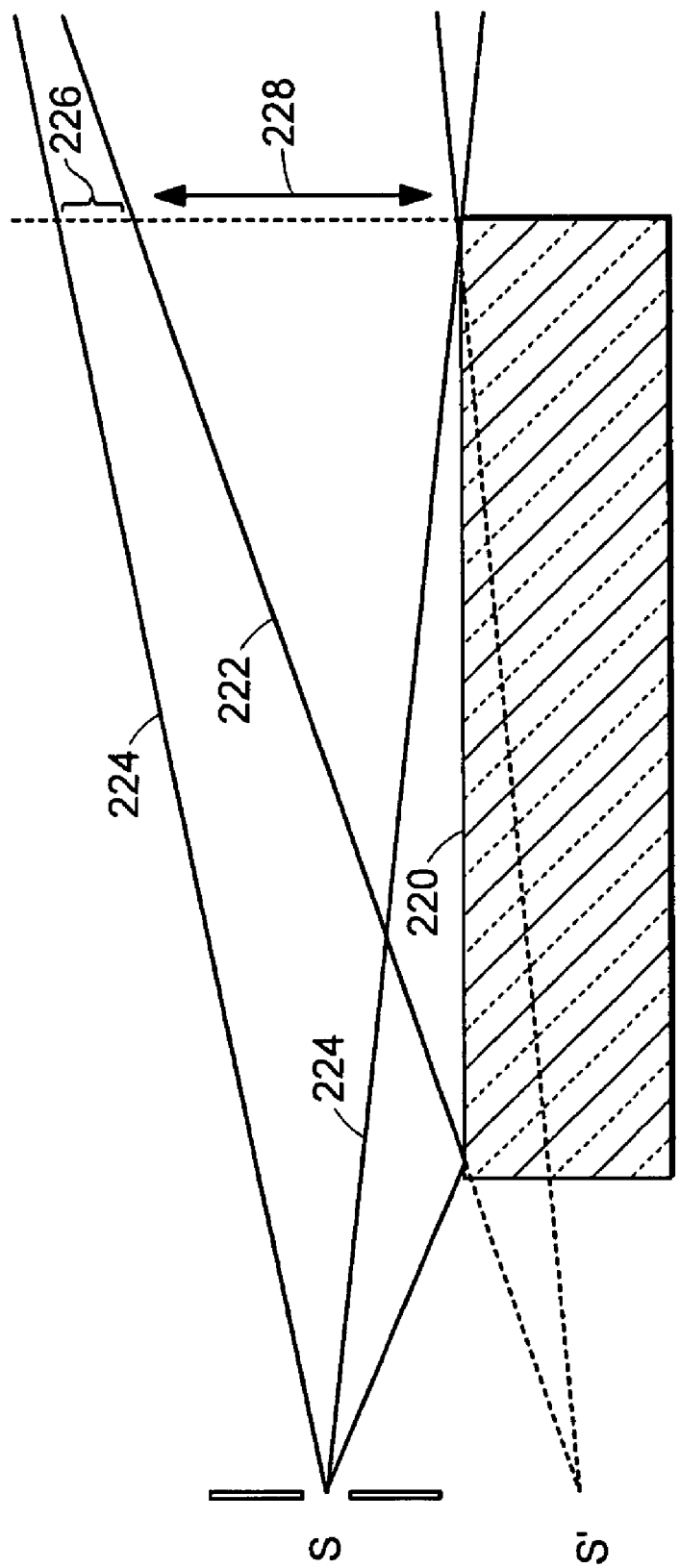
FIG. 3 is a cross-sectional view of a system used to illustrate "Lloyd's mirror".

FIG. 3 illustrates a concept called "Lloyd's mirror" that explains how wet-out can occur, for example, at the interface between prism peaks and adjacent surfaces. Lloyd's mirror is described in the book entitled *Fundamentals of Optics*, F. A. Jenkins and H. E. White (New York, McGraw-Hill), third edition, pp. 241-243 (1957), the entire teachings of which are incorporated herein by reference.

When light from a point source S reflects at grazing incidence off of a flat surface 220 of a glass plate, for example, there is a one-half wavelength phase change in the reflected light. When the reflected beam, for example, beam 222, combines with a beam 224 from the source S that is not reflected, interference fringes are produced. For example, area 226 is a dark band because beams 222 and 224 are 180 degrees out of phase. Alternating dark and bright bands are produced along area 228. The same result can occur if the light is traveling within the glass plate because the total internal reflection is at an angle beyond the critical angle.

Figure 4:
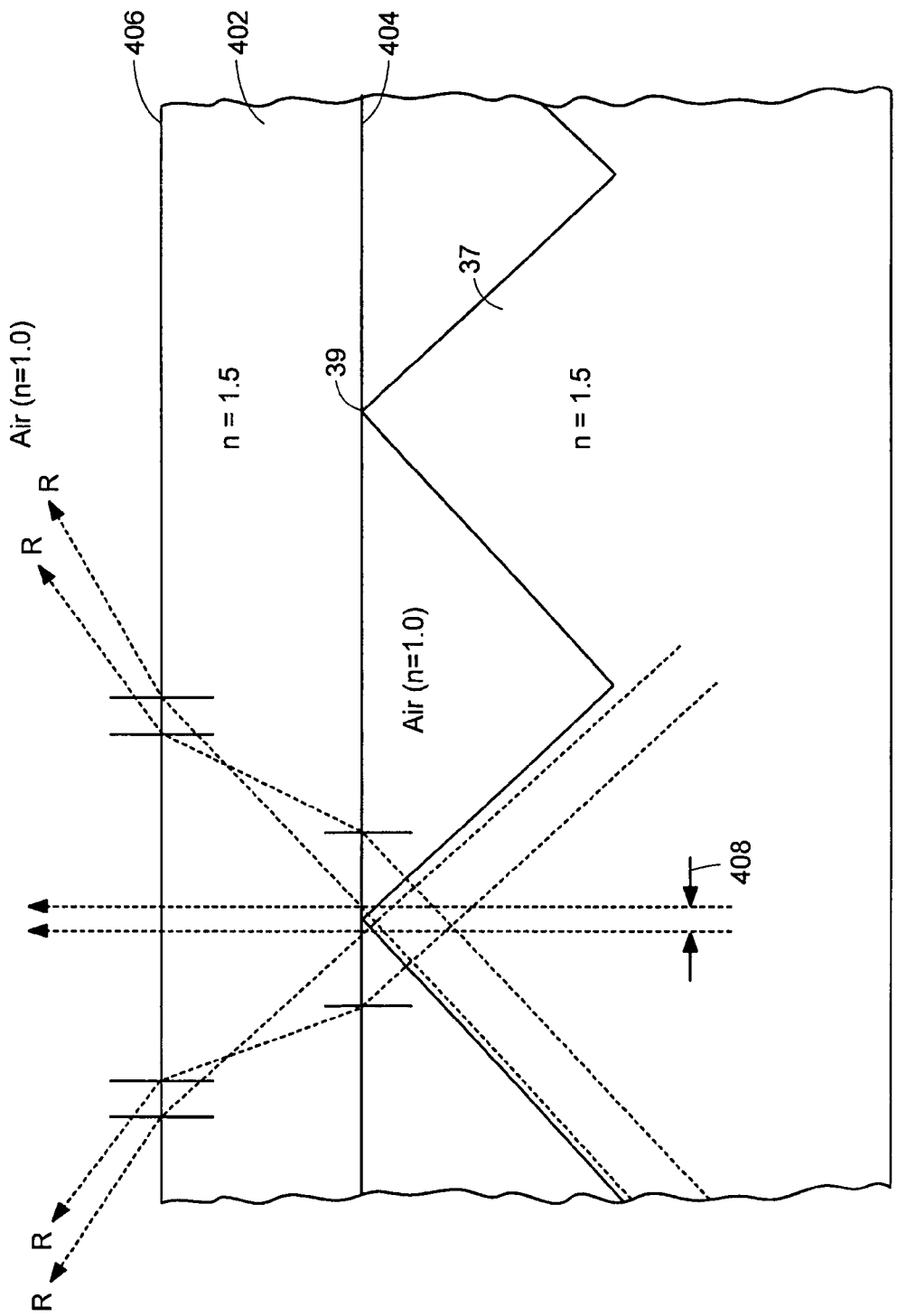
FIG. 4 is a diagram illustrating light paths that can influence wet-out conditions.
Figure 5:
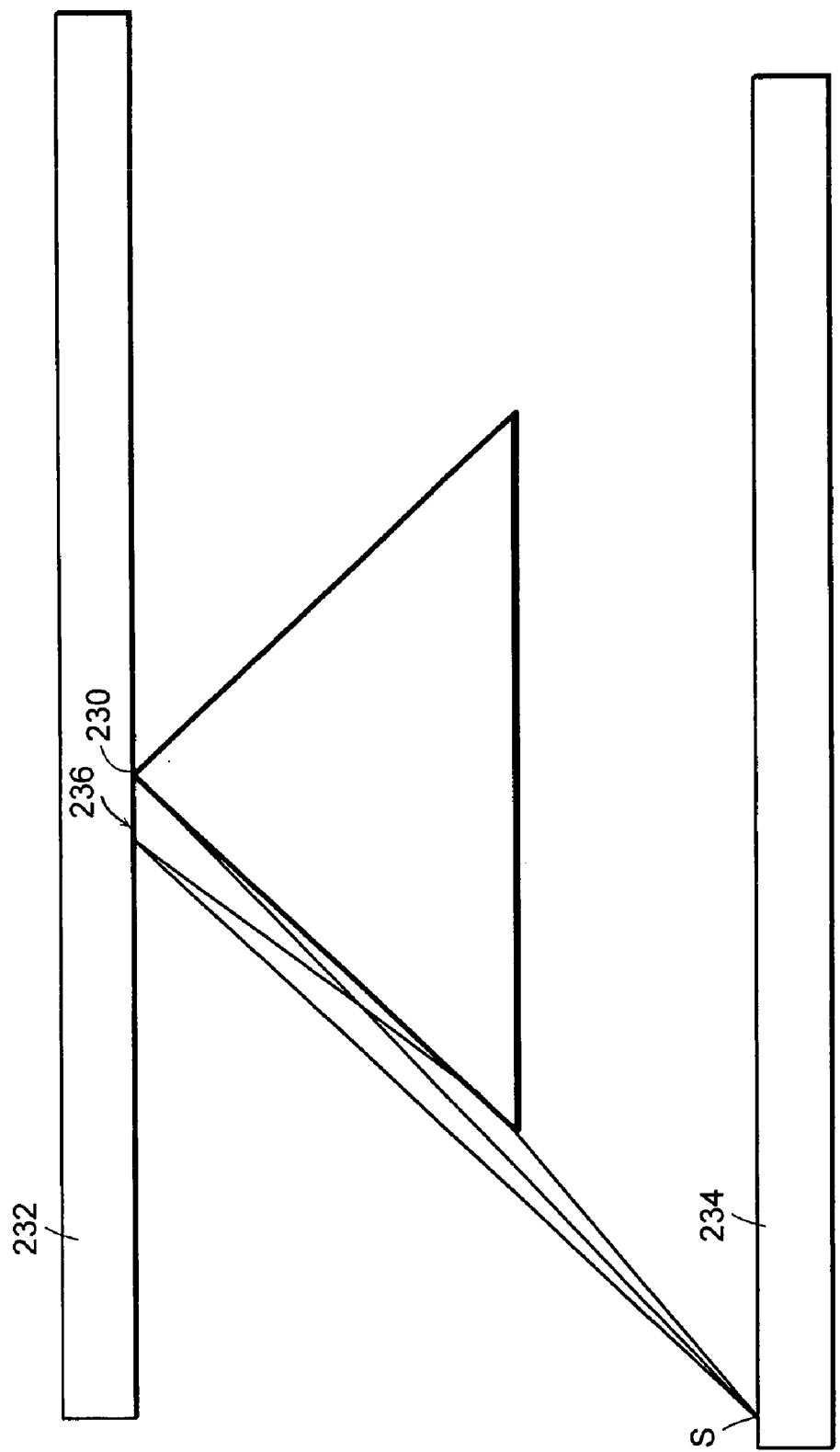
FIG. 5 is a diagram illustrating a first fringe area that can occur at the interface between a prism tip and an adjacent surface.
Figure 6:
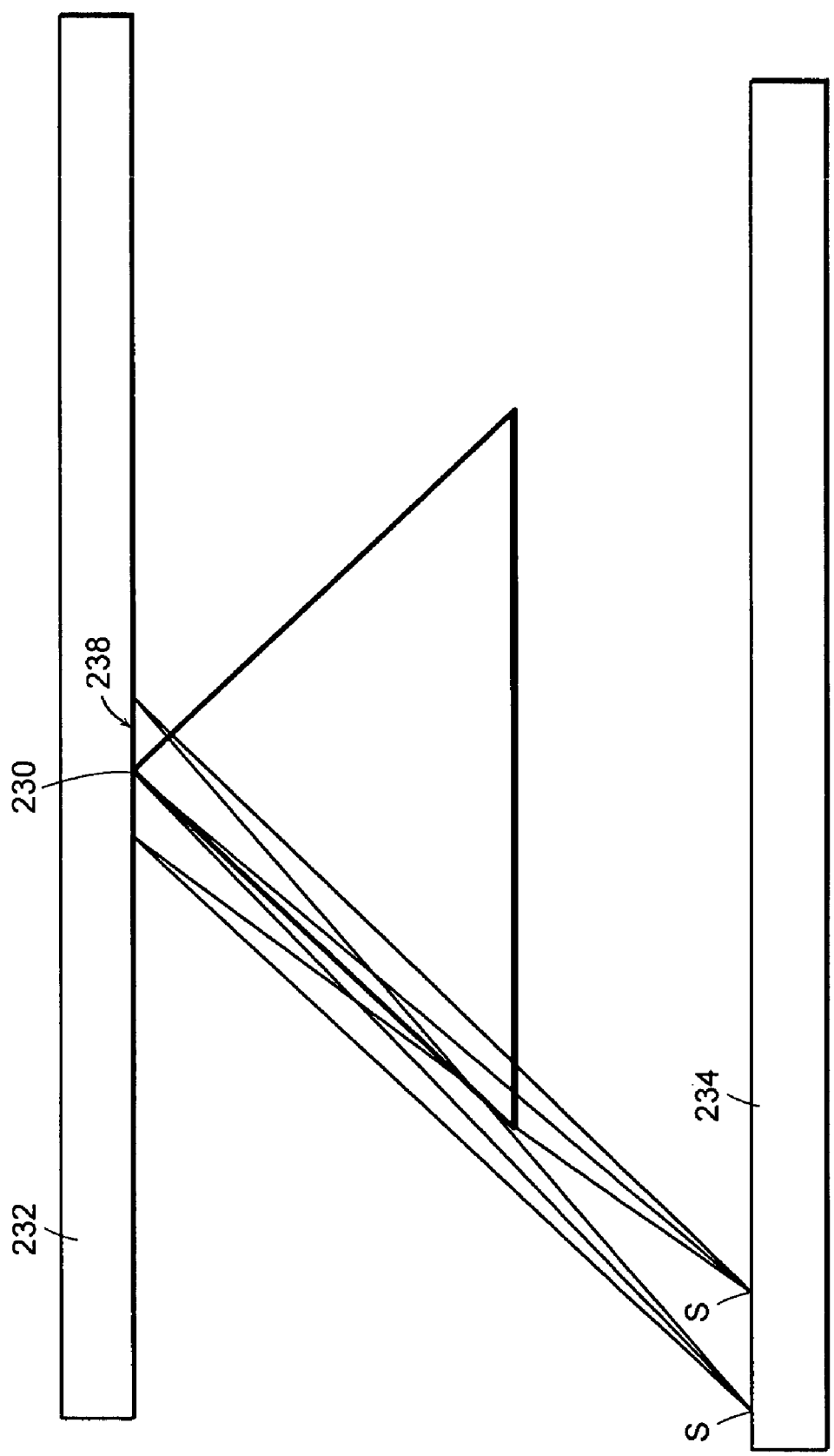
FIG. 6 is a diagram illustrating a second fringe area that can occur at the interface between a prism tip and an adjacent surface.
Figure 7:
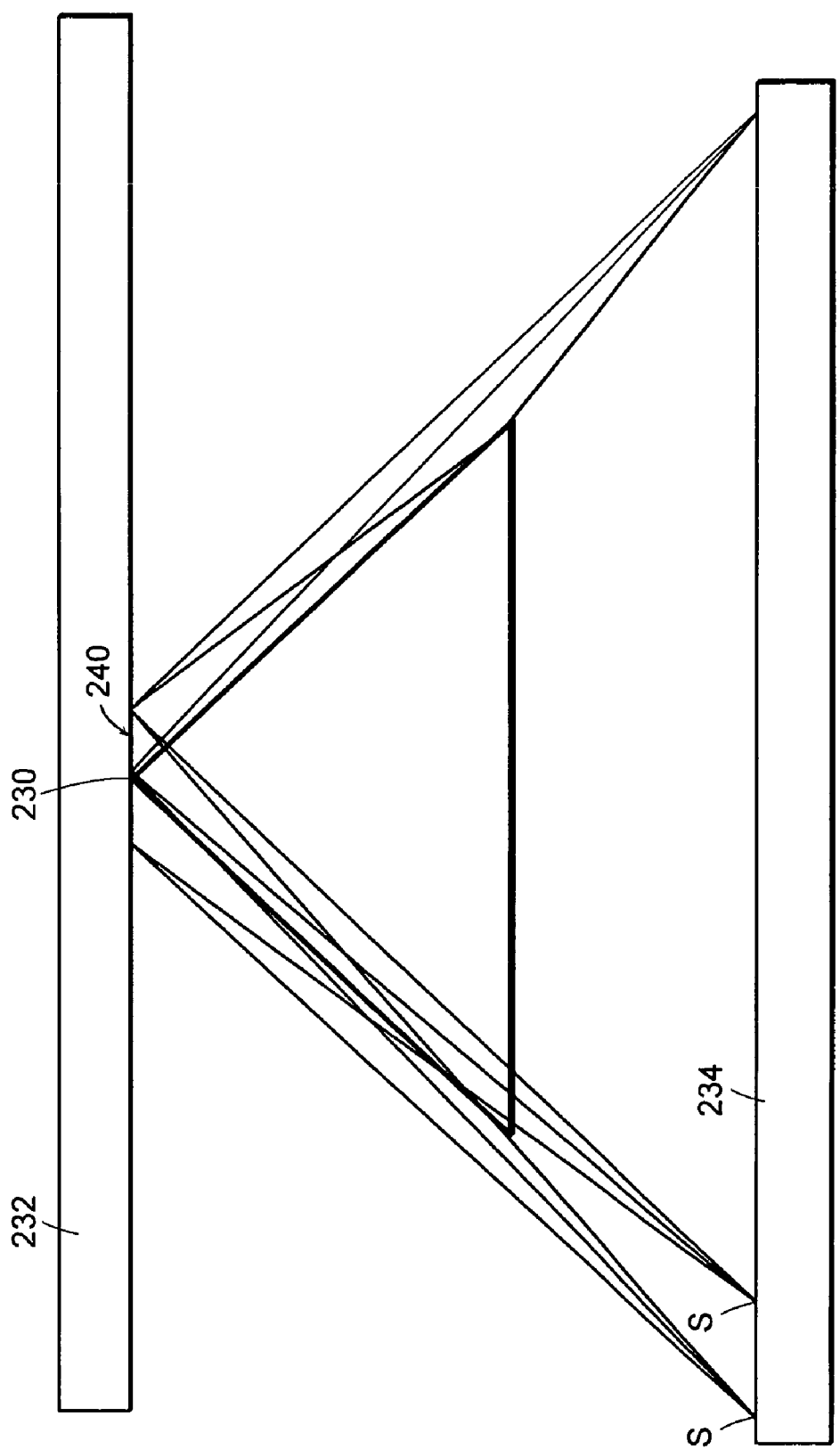
FIG. 7 is a diagram illustrating a third fringe area that can occur at the interface between a prism tip and an adjacent surface.
Figure 8:
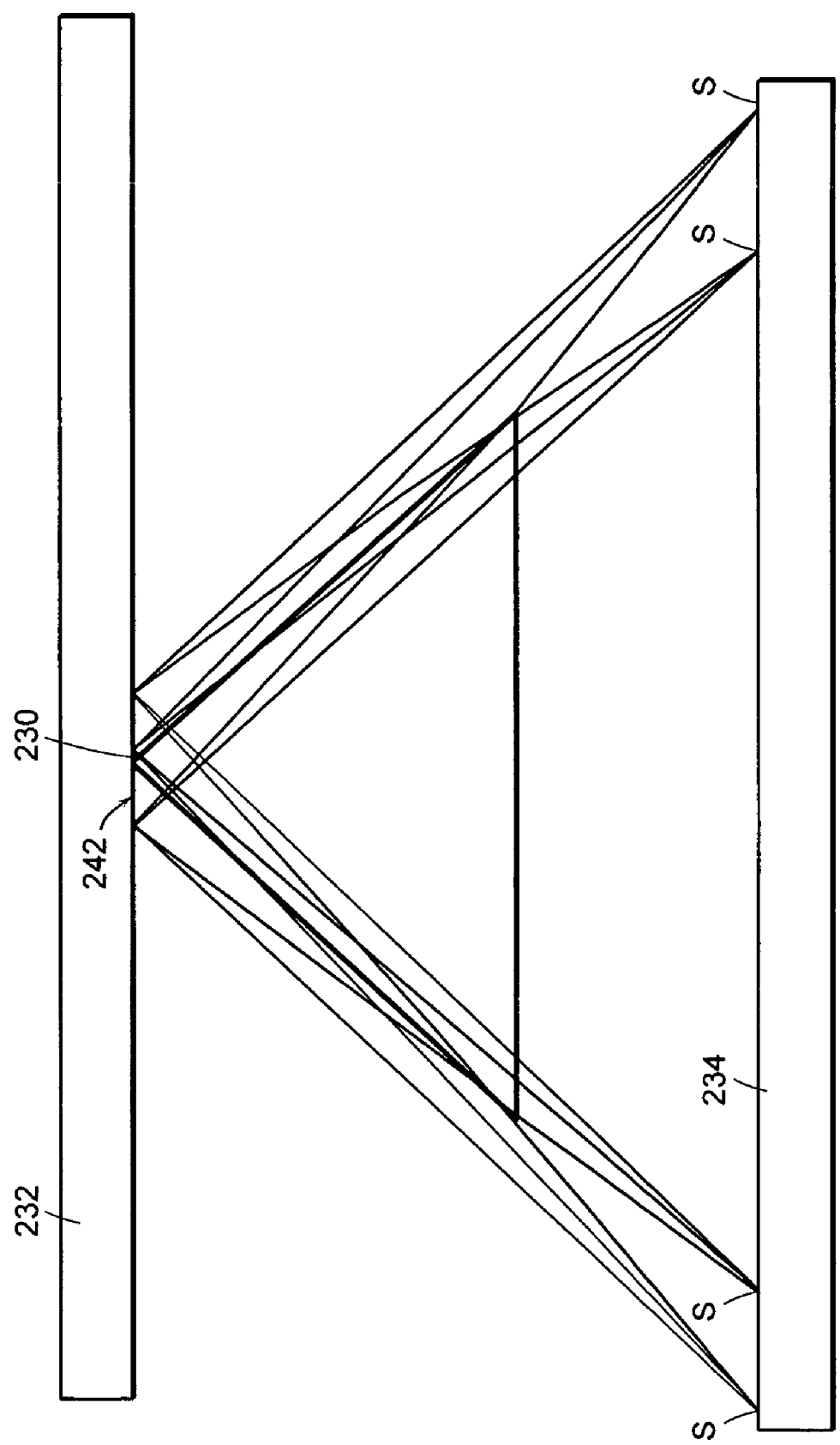
FIG. 8 is a diagram illustrating a fourth fringe area that can occur at the interface between a prism tip and an adjacent surface.

FIG. 4 illustrates other light paths that can influence wet-out conditions. In this embodiment, prisms 37 are positioned adjacent to a sheet or film 402 having a first surface 404 and a second surface 406. In a particular embodiment, surfaces 404 and 406 can be substantially optically clear. It can be seen that light rays R outside an approximate ± one micrometer space 408 at the peaks 39 of prisms 37 are refracted at surfaces 404 and 406. Light rays R within the space 408 are only refracted at surface 406. The result is a variation in the uniformity of the light pattern across surface 406. This appearance combines with the Lloyd's mirror fringes to create the wet-out condition.

FIGS. 5-8 illustrate four locations at which Lloyd's mirror fringes can occur for each sharp prism tip 230 at the interface between the tip and an adjacent surface, for example, a diffuser 232. The diffuser surface acts as an imaging screen making the fringes visible. The light source 234 is shown at the bottom of each figure. FIGS. 5-8 illustrate a first fringe area 236, a second fringe area 238, a third fringe area 240, and a fourth fringe area 242, respectively, in which interference fringes can occur.

The result for white light sources is a relatively wide band of gray fringes on either side of the prism tip 230. If the prism tip 230 is flat or slightly rounded in any way, there may also be Newton's fringes on top of the prism tips 230. One can calculate the distance, Delta X, between the successive Lloyd's mirror-type fringes using the following formula (although the fringes will actually be wider apart than calculated because of the forty-five degree angle of the diffuser 232 to the tip 230): Wavelength of a given light= [(Delta X)×(Distance between real and virtual images)]/Distance from source to diffuser surface. For example, assuming that the wavelength of red light is about 0.6 micrometers, the distance between real and virtual images is about ten micrometers, and the distance from the source to the diffuser surface is about 150.0 micrometers. These assumptions give a Delta X of about nine micrometers or, allowing for the forty-five degree diffuser tilt, it is about twelve micrometers. Thus, for red light, a dark fringe can occur just adjacent to the tip and then another dark fringe can occur about twelve micrometers from the tip.

With white light, there is a continuum of overlapping light and dark fringes in this area because of the continuum of wavelengths from about 300 to 700 nanometers. It has been discovered that by spacing the prism tip 230 away from adjacent surfaces, such as a diffuser, Lloyd's mirror fringes can be substantially minimized or even eliminated altogether.

Figure 9:
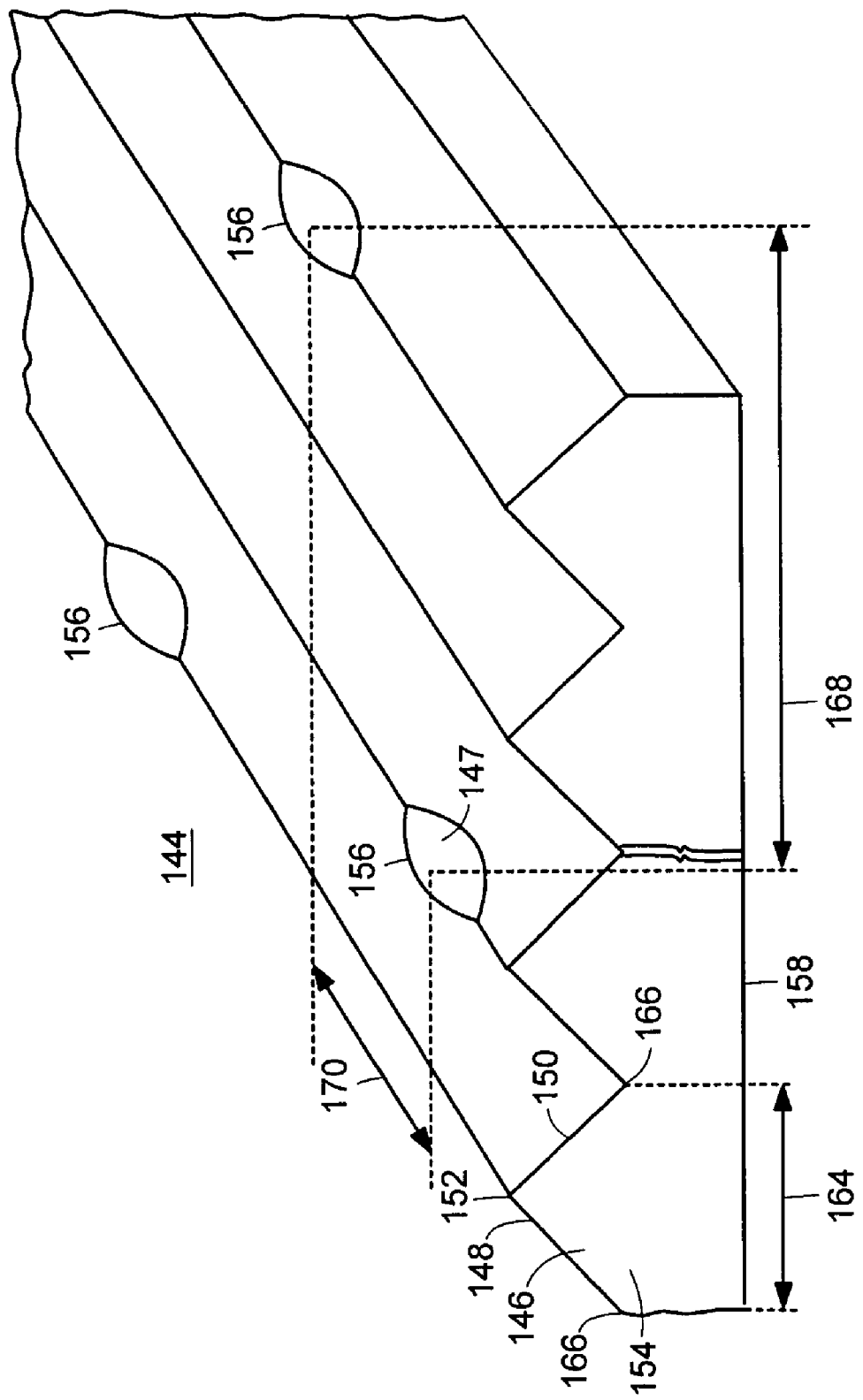
FIG. 9 is a partial perspective view of linear prisms that include elevated portions.
Figure 10:
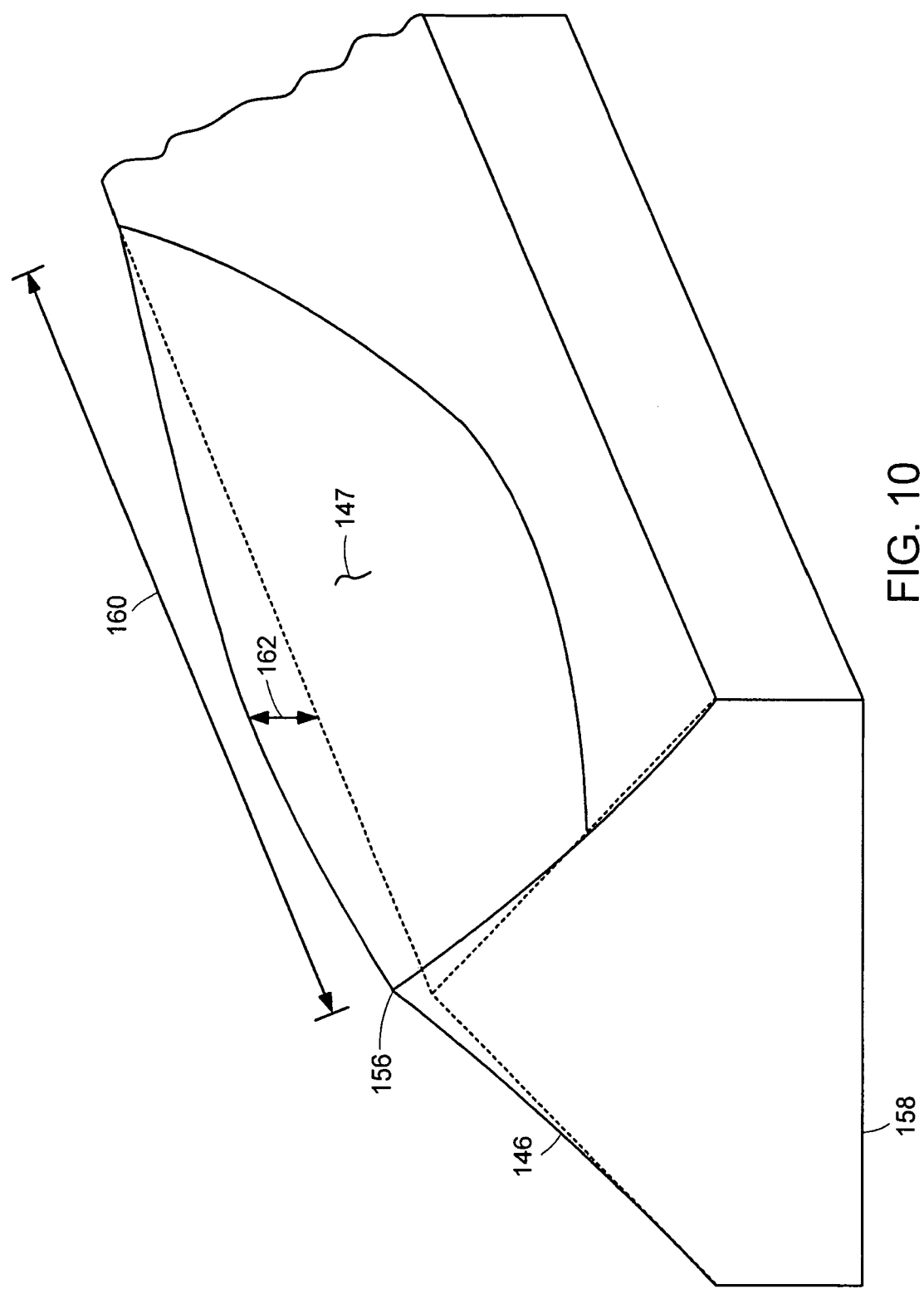
FIG. 10 is an enlarged perspective view of a linear prism that includes an elevated portion.

FIGS. 9 and 10 illustrate an embodiment of an optical film 144 that has been constructed according to principles of the present invention. This film 144 can be used in any embodiments disclosed herein, for example, the lighting systems of FIGS. 1 and 2. A plurality of linear prisms 146 each include a first side 148 and a second side 150 that meet at a peak 152. A base 154 is provided at a window side of each prism 146. Although linear prisms are illustrated, the film 144 can include microstructures, such as prisms, pyramids, truncated pyramids, lenticulars, cones, moth-eye structured surfaces, textured surfaces, base planes and plateaus, and/or lens arrays.

A plurality of elevated portions 156, which can also be referred to as bumps, features, pips, or differential height locators, can be provided on at least some of the peaks 152. In further embodiments, the elevated portions 156 can be provided on bottom surface or window side 158 and/or on the plateaus 28. The elevated portions 156 beneficially space the film 144 away from adjacent optical sheets, surfaces, films, substrates, or other layers to minimize wet-out, Newton's rings, abrasions, moiré fringes, or other undesirable optical conditions. The slight curvature created in the prism side 146, for example, surface 147, reduces Lloyd's mirror fringe effects.

In a particular embodiment, the elevated portions 156 are randomly located on the film 144. In another embodiment, the elevated portions 156 are located on the film 144 in a predetermined pattern. In the embodiment of FIGS. 9 and 10, each elevated portion 156 is elongated having a length 160 between about one and ten micrometers. The elevated portion 156 can have a height 162, i.e., the distance the portion 156 extends above the peaks 152, between about 0.3 and 20 micrometers. The walls of the elevated portion 156 can be any shape including straight, convex, or concave.

In other embodiments, the pitch 164 of the linear prisms 146 can have a range between about 10 and 100 micrometers, and in a particular embodiment, the pitch can be about 49 micrometers. The distance 168 between elevated portions 156, i.e., the distance between elevated portions 156 perpendicular to the longitudinal axes of the linear peaks 152, can have a range between about 2,540 and 5,080 micrometers (0.1 and 0.2 inches). The distance 170, or the distance between portions 156 parallel to the longitudinal axes of the linear peaks 152, can have a range between about 2,540 and 5,080 micrometers (0.1 and 0.2 inches). In particular embodiments, a very dense random bump surface is created on the linear prisms 146.

Figure 11:
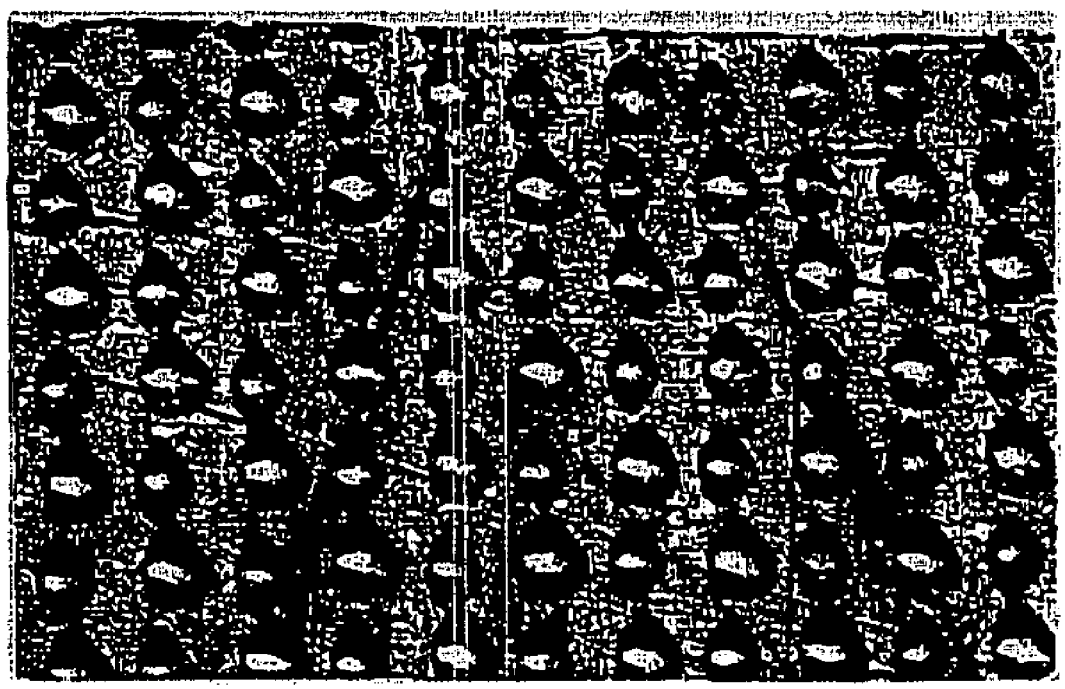
FIG. 11 is a top view of a tool that is used to form the elevated portions shown in FIGS. 9 and 10.

The specific shape and dimensions of the elevated portions 156 can vary. In one embodiment, the features are diamond skived in the tooling so that the part formed with the tooling has clear, smooth transparent portions 156 which refract light but do not scatter light. FIG. 11 is a top view of a tool, magnified 500 times, that can be used to form the elevated portions 156.

In one embodiment of a method to form elevated portions 156, a copper-plated or nickel-plated drum is faced to a very smooth surface. Linear prism grooves of constant apex height (depth in the drum) are then ruled into the drum. The elevated portions 156 can be formed in the drum with a dynamic servo system that has a diamond cutting tip and a tracking system which is guided by the grooves or by a linear encoder. A constant micrometer depth level elevated portion 156 can be added to the peaks 152 of the prisms 146, i.e., valleys of the prisms cut on the drum, at a random spacing. The random spacing is controlled in a particular embodiment using a random number generator which is set with a minimum elevated portion 156 spacing criteria.

When elevated portions 156 are cut into a smooth drum surface, the copper-plated or nickel-plated drum is first smoothed, then the elevated portions 156 are added to a constant micrometer level depth in whatever is desired. In a particular embodiment, the depth is deeper than desired so that the drum can be refaced or smoothed until the elevated portions 156 are at the desired depth. The drum can be chrome-plated to add durability to the manufacturing process. In further embodiments, the drum can be used to cast a microstructure pattern on the window side of the film. The pattern can be random, regular, or a combination thereof. Thus, in one embodiment, a method of forming a pattern on a film includes facing a surface of a drum until the surface is substantially smooth, engraving a negative image of the pattern in the surface of the drum, refacing and re-engraving the surface of the drum, if necessary, until the negative image of the pattern is a desired depth in the surface of the drum, and casting, with the surface of the drum, the pattern on the film. The pattern can be cast on a window side of the film. In one embodiment, structures in the pattern have a height in the range of between about 0.010 and 3.00 micrometers.

The height 162 of the elevated portion 156, which results in the finished part or film, is dimensioned such that there is a minimum of about one-half micrometer air space between the top of the peaks 152 and the adjacent part for reducing, for example, wet-out conditions between films, Newton's rings, and abrasion, for example. In further embodiments, if the adjacent part is a glass bead diffuser, for example, that provides one-half of the two micrometer air space needed, then the elevated portion 156 only needs to make up one-half of the total air gap needed.

Figure 12:
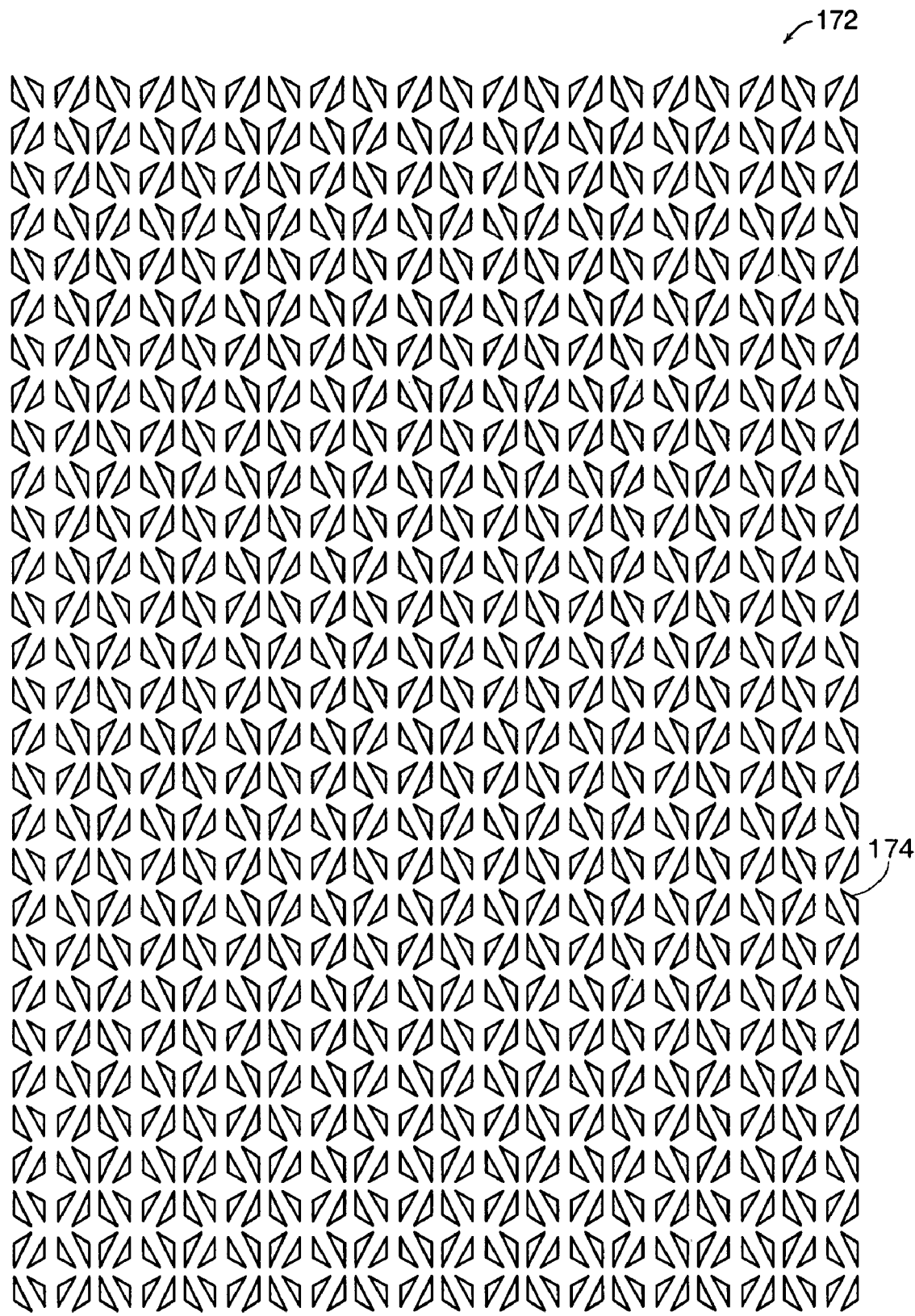
FIG. 12 is a plan view of a pattern that can be used to form differentially-cured pattern portions on a film.

In any of the disclosed embodiments, one or both sides of a film, for example, the prisms 146 or bottom surface 158, can include a first cured portion and a second cured portion that are formed from a same light or radiation-curable material as disclosed in U.S. patent application Ser. No. 09/928,247, filed on Aug. 10, 2001 and published as U.S. Patent Application Publication No. US2002/0051866 on May 2, 2002, the entire teachings of which are incorporated herein by reference. That is, a mask layer or radiation-blocking layer is placed over the prisms 146 or bottom surface 158 while being cured with a radiation source resulting in a visible discontinuity on the surface of the cured structure. An exemplary pattern 172 that can be provided on the mask layer is illustrated in FIG. 12. In this embodiment, the pattern includes a logo 174 comprising four obtuse scalene triangles. In other embodiments, the pattern can be substantially random and can include any geometric shape. The radiation-curable material can be cured by actinic radiation, which can be defined as electromagnetic radiation that can cause a photochemical reaction. If a differentially-cured pattern is formed on the window side of the prisms, the shape of the elevated portion on the opposing side may distort or change the shape of the elevated portion.

It is known that the human eye cannot revolve more than about 200 micrometers (0.008 inches) at a normal reading or viewing distance of about 0.31 meters (1.0 foot). Also, a gap between films of about 2.0 micrometers is required to substantially reduce or eliminate the optical effects that cause the problems. Thus, if the differentially-cured structures or elevated portions 156 are less than 200 micrometers in size and they are spaced randomly or non-randomly apart by a distance of 1,000 micrometers so that less than about 10 percent of the surface contacts the adjacent surface, the visible defects do not appear. The elevated portions 156 or differentially-cured structures are wide enough so that if a prism film is a mating part, the apex of the prisms matches up and rests on the portions 156, for example, to create a desired air gap.

In further embodiments, a moth-eye structure or moth-eye structured surface can be formed on the window side or bottom surface 158 to improve light throughput through the film 144. Moth-eye structures are explained in more detail in U.S. Pat. No. 6,356,389, which issued to Nilsen et al. on Mar. 12, 2002, which corresponds to International Publication No. WO 01/35128, published on May 17, 2001. The teachings of each are incorporated here in their entirety.

Figure 13:
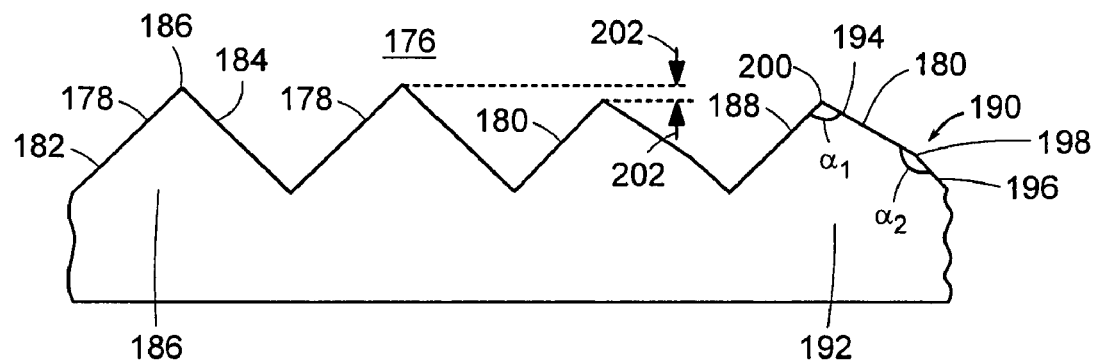
FIG. 13 is a partial cross-sectional view of a light-redirecting film in accordance with other embodiments of the invention.

FIG. 13 is a partial cross-sectional view of a light-redirecting film 176 in accordance with other embodiments of the present invention. The film 176 includes a first plurality of linear prisms 178 having first uniform dimensions and a second plurality of linear prisms 180 having second uniform dimensions. The first plurality of linear prisms 178 includes a first side 182, a second side 184, and a base or window side 186. In one embodiment, the first side 182 and the second side 184 meet at a 90 degree angle at an apex or peak 186. The second plurality of linear prisms 180 includes a first side 188, a second side 190, and a base or window side 192. In this embodiment, the second side 190 includes a first planar surface 194 and a second planar surface 196 which meet at point 198 as disclosed in U.S. patent application Ser. No. 10/023,204, filed on Dec. 13, 2001 and published as U.S. Patent Application No. 2002/0097496 on Jul. 25, 2002, the entire teachings of which are incorporated herein by reference.

In one embodiment, the first side 188 is substantially planar and meets the first planar surface 194 at apex or peak 200. The included angle $\alpha_1$ can have a range between about 60 and 120 degrees, and about 93 degrees in a particular embodiment. The included angle $\alpha_2$ between planar surfaces 194 and 196 can have a range between about 160 and 180 degrees, and about 171 degrees in a particular embodiment. The peaks 186 extend above peaks 200 as indicated by arrows 202 to space an adjacent layer away from film 176. In particular embodiments, the peaks 186 extend above peaks 200 in the range of about 0.5 to 20 micrometers. In other embodiments, two or more planar surfaces can be provided on one or more sides of prisms 178, 180.

In particular embodiments, the prisms 178 and 180 can be grouped in zones that periodically alternate along the film 176. A predetermined number of prism(s) 178 can be positioned adjacent to a predetermined number of prism(s) 180 such that an adjacent structure is sufficiently spaced away from film 176 to reduce visible optical defects. In other embodiments, the prisms 178 and 180 can be randomly positioned on the film 176. In a particular method for forming film 176, the portion of a mold corresponding to prisms 180 can be cut first, followed by the cutting of the mold corresponding to prisms 178.

Figure 14:
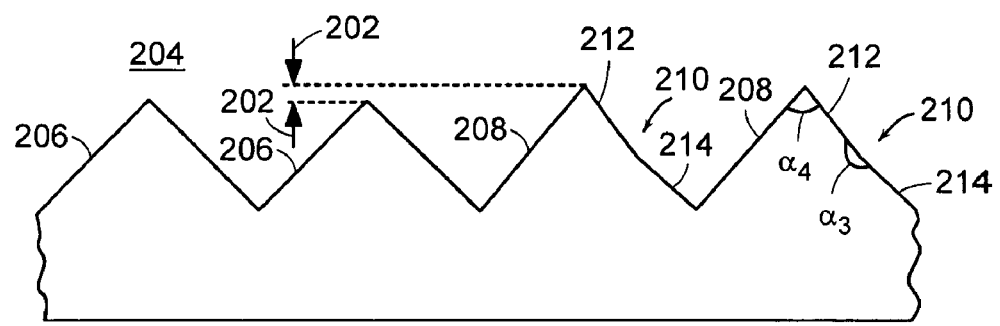
FIG. 14 is a partial cross-sectional view of a light-redirecting film in accordance with further embodiments of the invention.

FIG. 14 illustrates another embodiment of a film 204 which has a first plurality of linear prisms 206 and a second plurality of linear prisms 208. In this embodiment, the prisms 208 have a side 210 that has two planar surfaces 212, 214 that form angle $\alpha_3$ that is greater than 180 degrees. In a particular embodiment, included angle $\alpha_4$ can have a range between about 60 and 120 degrees, and about 87 degrees in a particular embodiment. The prisms 206, 208 can be positioned on the film 204 similar to the prisms 178, 180 of film 176. In this embodiment, the portion of mold corresponding to prisms 206 can be cut first followed by the cutting mold portion of mold corresponding to prisms 212.

Optical structures and inventive concepts are disclosed in commonly owned U.S. patent application Ser. No. 10/428,318, filed on May 2, 2003, the entire teachings of which are incorporated herein by reference. The optical structures and concepts can be used with the inventive principles disclosed herein.

While this invention has been particularly shown and described with references to various embodiments thereof, it will be understood by those skilled in the art that various changes in form and details may be made therein without departing from the scope of the invention encompassed by the appended claims.

What is claimed is:

1. An optical film for enhancing the brightness of light produced by a light source, said optical film having a first face and a second face, the first face comprising at least one plurality of prisms having a first side and a second side terminating at a peak, said plurality of prisms having a first uniform set of pitch, height, angle at the peak, and side length, and further wherein at least some of the peaks include elevated portions extending above the peaks.

2. The optical film of claim 1, wherein the optical film redirects light in a collimating fashion.

3. The optical film of claim 1, wherein the elevated portions extend above the peaks to space an adjacent surface away from the peaks to reduce visible defects.

4. The optical film of claim 3, wherein the elevated portions space the adjacent surface away from the peaks by at least about 0.3 micrometers.

5. The optical film claim 1, wherein the optical film forms a part of a rear-projection screen, a computer display or monitor, an overhead projection display, or a liquid crystal display.

6. The optical film of claim 1, wherein the second face of the optical film includes the microstructures that have a series of base planes and a series of plateaus at a window side of the microstructures, the base planes and the plateaus running along a first axis, the plateaus and base planes alternating along a second axis, the plateaus not being coplanar with the base planes.

7. The optical film of claim 6, wherein at least some of the plateaus include an elevated portion extending above the plateaus.

8. The optical film of claim 1, wherein the second face of the optical film includes the microstructures selected from linear prisms, prisms, pyramids, truncated pyramids, lenticulars, cones, moth-eye structured surfaces, diffractive structures, diffractive structured surfaces, textured surfaces, lenses, base planes and plateaus, or lens arrays.

9. The optical film of claim 1, further comprising a microstructure pattern provided on second face of the optical film.

10. The optical film of claim 9, wherein at least some areas of the second face include an elevated portion extending above the second face.

11. The optical film claim 1, wherein a differentially-cured pattern is formed on and/or within the second face of the optical film.

12. The optical film of claim 11, wherein the pattern is formed by placing a mask over the second face of the optical film, the mask including opaque areas and transparent areas, and curing the optical film with a radiation source, wherein the opaque areas block the radiation to cause the area of the second face of the optical film underneath the opaque areas to be cured at a different amount of time or rate than the area underneath the transparent areas, resulting in the pattern.

13. The optical film of claim 1, further comprising a moth-eye structured surface provided on second face of the optical film.

14. The optical film of claim 13, wherein at least some areas of the window side include an elevated portion extending above the window side.

15. The optical film of claim 1, wherein the plurality of prisms have an included angle of between about 60 and 120 degrees.

16. The optical film of claim 1, wherein the elevated portions space the optical film away from an adjacent film, surface, or structure.

17. The optical film of claim 16, wherein the adjacent film, surface, or structure includes at least one of a light-redirecting film, collimating film, abrasion reduction layer, light guide, polarizing structure, or a diffuser.

18. An optical film for enhancing the brightness of light produced by a light source, said optical film having a first face and a second face, the first face comprising:

at least a first plurality of prisms, said first plurality of prisms having a first set of pitch, height, angle at the peak, and side length;

at least a second plurality of prisms, said second plurality of prisms having a second set of pitch, height, angle at the peak, and side length, wherein at least one of the values of pitch, height, angle at the peak, or side length of the first set is different from the corresponding value in the second set, and further wherein the prisms of the first plurality and the prisms of the second plurality are grouped in zones that periodically alternate along the film.

19. The optical film of claim 18, wherein at least some of the peaks include elevated portions extending above the peaks.

* * * * *